June 17, 1969     T. A. WITZEL     3,449,827

METHOD OF MAKING COMMUTATOR ASSEMBLY

Filed Oct. 10, 1966     Sheet 1 of 2

INVENTOR.
Thomas A. Witzel
BY
Donald P. Selucki
ATTORNEY

June 17, 1969 T. A. WITZEL 3,449,827
METHOD OF MAKING COMMUTATOR ASSEMBLY
Filed Oct. 10, 1966 Sheet 2 of 2

INVENTOR.
Thomas A. Witzel
BY
Donald P. Selucki
ATTORNEY

United States Patent Office 3,449,827
Patented June 17, 1969

3,449,827
METHOD OF MAKING COMMUTATOR ASSEMBLY
Thomas A. Witzel, Honeoye Falls, N.Y., assignor to General Motors Corporation, Detroit, Mich., a corporation of Delaware
Filed Oct. 10, 1966, Ser. No. 585,521
Int. Cl. H01r 43/00; B29f 1/10; B29d 3/00
U.S. Cl. 29—597        4 Claims

ABSTRACT OF THE DISCLOSURE

A method for manufacturing commutator assemblies wherein a heat sealable paper disc is positioned over the slots of a slotted metallic blank, holding tabs are punched through the paper and blank, an internal and an external diameter are punched from the blank, a plastic material is molded upon a portion of the blank adjacent the heat seal paper, metallic extensions extending from the periphery of the mold material are formed and the extensions are bent in the form of hooks to which lead wires may be connected.

---

This invention relates to methods of manufacture and more specifically to an improved method for making the commutator for a miniature motor.

An object of the present invention is to provide a simple and economical method for assembling a commutator for a miniature electric motor.

An other object of the present invention is to provide an improved method for mass producing a commutator for a miniature motor.

Further objects and advantages of the present invention will be apparent from the following description, reference being had to the accompanying drawings wherein a preferred embodiment of the present invention is clearly shown.

Figure 1:
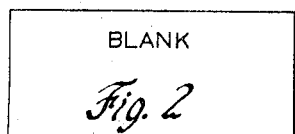
FIGURE 1 is a flow diagram showing the process described herein.
Figure 1:
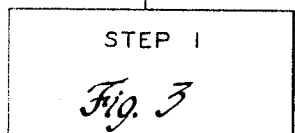
Figure 1:
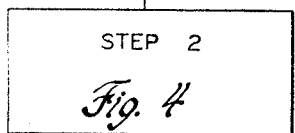
Figure 1:
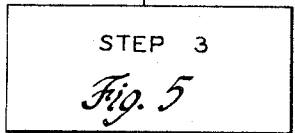
Figure 1:
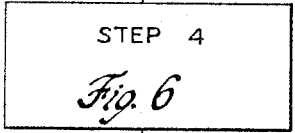
Figure 1:
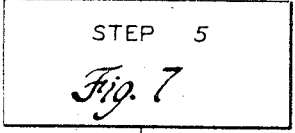
Figure 1:
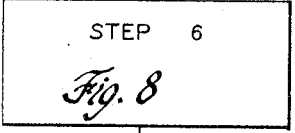
Figure 1:
Figure 2:
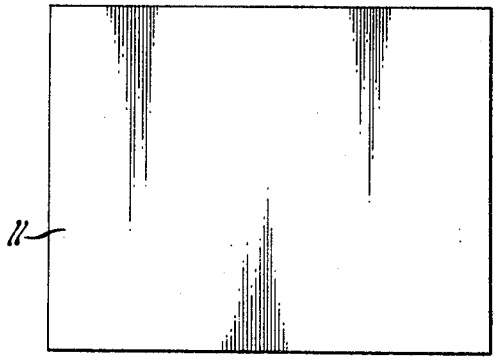
FIGURE 2 illustrates the blank provided for the novel process described herein.
Figure 3:
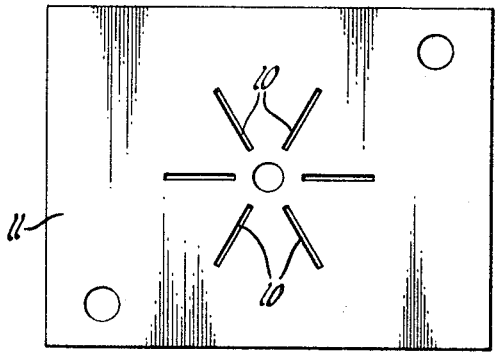
Figure 4:
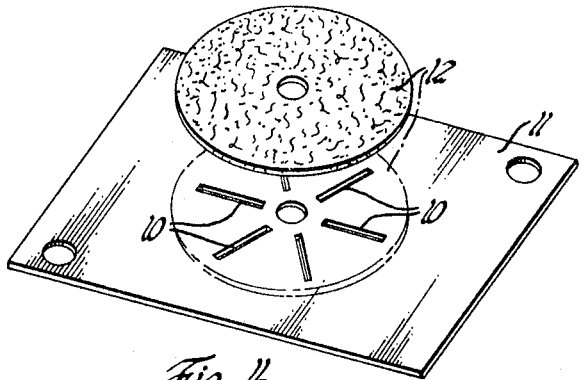
Figure 5:
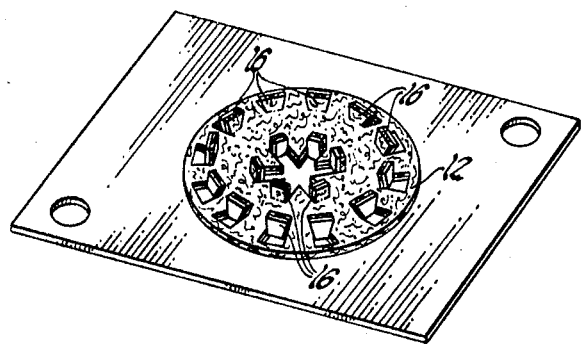
Figure 8:
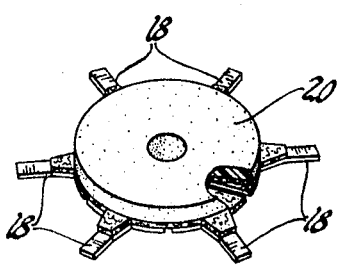
Figure 6:
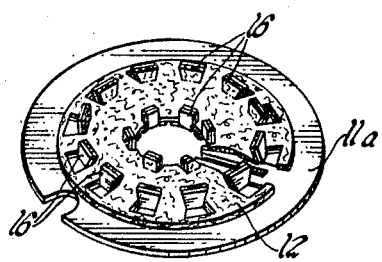
Figure 9:
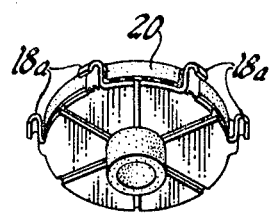
Figure 7:
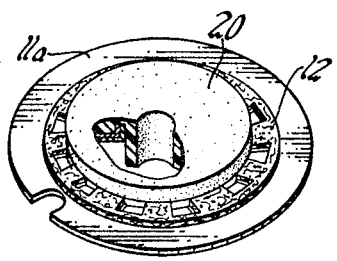

FIGURE 3 sets forth the first step of manufacture;

FIGURE 4 illustrates the entry into the process of the heat seal paper;

FIGURE 5 shows the configuration of the joined blank and heat seal paper after the punching out of the locating tabs;

FIGURE 6 illustrates the next step in the process in which the I.D. and O.D. of the commutator have been punched out;

FIGURE 7 shows the configuration of the commutator after the molding step has been completed;

FIGURE 8 illustrates the outwardly extending portions radially projecting from the area in which the molding material has been affixed to the tab;

FIGURE 9 illustrates the finished products of the process in a perspective view.

Step 1 of the process of the subject invention involves punching slots 10 projecting radially outwardly extending from a point which is a predetermined distance from the center of the blank 11. In the finished product, these slots provide the separations between the pickup surfaces of the finished commutator.

Step 2, as illustrated in FIGURE 4, involves affixing heat seal paper 12 to the commutator covering all of the slots 10 in relatively circular fashion while extending a given distance beyond the furthermost radial extension of the slots to guarantee being beyond the point where locating tabs will be punched from the blanks in the next step. Therefore, the diameter of the substantially circular heat seal paper blank should be greater than the dimension of the molded base so as to form a seal in the mold beyond the tabs to be punched but less than the outer diameter which will later have hooks formed therein. The heat seal paper 12 is preferably a thermal setting adhesive, as opposed to the compressive type, in order to avoid overrunning of any solvent into the areas in which good electrical contact must be maintained.

Step 3 seen in FIGURE 5 involves punching holding tabs 16 in two concentric circles greater in diameter than the shaft hole previously punched in the blank contemporaneous with the forming of the radially extending slots 10. The tabs are bent at 90° away from the blank in the direction of the heat seal paper and taper to a greater dimension as they extend away from the face of the commutator in order to provide greater holding capabilities after molding.

Step 4 shown in FIGURE 6 involves punching the interior and outer diameter from the blank 11 bringing it to a new configuration 11a. The internal diameter punch is a close tolerance punch required because the I.D. fits over a locator pin in the mold and the fit must necessarily prevent plastic from flowing into the slots from the inside edge of the blank.

Referring to FIGURE 7, step 5 involves molding by either the injection or compression method. Compression molding is the more difficult operation to perform and, therefore, injection molding is the most desired from a production standpoint. However, due to the high pressure involved in injection molding, close tolerances are required throughout the forming of the blank in order to guarantee no overrunning of the plastic material 20.

Step 6, as seen in FIGURE 8, is the forming of the bars 18 extending outwardly away from the outer periphery of the outer tab ring around which the plastic material has been molded. As previously stated, the heat seal paper extends just beyond the outer ring of tabs but terminates before the area in which these bars are formed.

Step 7 which is seen completed in FIGURE 9 involves forming hooks 18a of the bars 18 formed during the previous step that adapt themselves to be automatically hooked by a wire that is wound and welded thereto in a later stage of manufacture of the motor. This is the final configuration of the subject commutator.

The subject process taught herein provides an economical, accurate and automated method of producing a miniature part which does not adapt itself to mass production utilizing techniques taught by the prior art. The exact choice of molding materials and finishing operations are left to the artisan completing a particularly designed motor. The basic steps are set forth herein readily adapt themselves to minor changes in the technique to fit a given operation while still retaining the inventive character of the novel process disclosed.

While the embodiment of the present invention, as herein disclosed, constitutes a preferred form, it is to be understood that other forms might be adopted.

What is claimed is:

1. The method of making a commutator, the steps comprising: punching slots in a copper blank; securing heat seal paper to the blank covering said slots substantially the same size and shape of the blank; punching holding tabs through the copper blank and the heat seal paper in a circular fashion around the center of said blank for later securing a molding material thereto; molding thermal setting plastic material to the blank substantially limited with the outer periphery by said holding tabs; punching extensions from the blank extending away from the area in which molding material is secured to the blank; and bending said extensions to form hooks to which wires can later be secured.

2. A method of forming a commutator according to claim 1 wherein said slots formed in said blank are equally spaced and extend radially from the center of that said blank starting at a preselected point removed from the center of said blank.

3. The method of making a commutator according to claim 1 wherein said holding tabs are struck out tabs generally wider in dimension at the furthermost extension of said tabs from said blank than near the point of attachment to said blank; said struck out tabs forming a plurality of circular paths removed a given distance from the center of said blank.

4. The method of making a commutator according to claim 1 wherein the extensions formed in said blank extend away from the area in which the molding material is secured and correspond in number to the number of slots formed in said blank projecting radially away from the center of said blank.

References Cited

UNITED STATES PATENTS

| | | | |
|---|---|---|---|
| 1,432,038 | 10/1922 | Russell | 310—235 |
| 1,592,326 | 7/1926 | Basfian. | |
| 1,901,955 | 3/1933 | Giaimo | 29—597 |
| 2,421,845 | 6/1947 | Moeller | 29—597 X |
| 3,014,144 | 12/1961 | Fleischmann et al. | 310—235 X |
| 3,187,210 | 6/1965 | Ost. | |
| 3,244,917 | 4/1966 | Gute | 310—237 X |

CHARLIE T. MOON, *Primary Examiner.*

C. E. HALL, *Assistant Examiner.*

U.S. Cl. X.R.

264—272, 274, 276